US009279530B2

(12) United States Patent
Schmidt (10) Patent No.: US 9,279,530 B2
(45) Date of Patent: Mar. 8, 2016

(54) QUICK DISCONNECT COUPLING (71) Applicant: Colder Products Company, St. Paul, MN (US)

(72) Inventor: Mark F. Schmidt, Forest Lake, MN (US)

(73) Assignee: Colder Products Company, St. Paul, MN (US)

( * ) Notice: Subject to any disclaimer, the term of this patent is extended or adjusted under 35 U.S.C. 154(b) by 93 days.

(21) Appl. No.: 13/918,304

(22) Filed: Jun. 14, 2013

(65) Prior Publication Data

US 2013/0333767 A1   Dec. 19, 2013

Related U.S. Application Data (60) Provisional application No. 61/660,360, filed on Jun. 15, 2012.

(51) Int. Cl.
*F16L 37/28* (2006.01)
*F16L 37/084* (2006.01)
*F16L 37/35* (2006.01)

(52) U.S. Cl.
CPC ............ *F16L 37/28* (2013.01); *F16L 37/0841* (2013.01); *F16L 37/35* (2013.01); *Y10T 137/0491* (2015.04); *Y10T 137/7504* (2015.04)

(58) Field of Classification Search
CPC ........... F16L 37/28; F16L 37/30; F16L 37/32; F16L 37/34; F16L 37/38; F16L 37/40; F16L 37/0841; F16L 37/35
USPC .......................... 137/614.03–614.05; 285/317
See application file for complete search history.

(56) References Cited

U.S. PATENT DOCUMENTS

| 592,899 | A | | 11/1897 | Wilson | |
|---|---|---|---|---|---|
| 3,625,251 | A | * | 12/1971 | Nelson | ..................... 137/614.04 |
| 4,070,003 | A | | 1/1978 | Shames et al. | |
| 4,469,136 | A | | 9/1984 | Watkins | |
| 4,483,368 | A | * | 11/1984 | Panthofer | ................. 137/614.04 |
| 4,541,457 | A | | 9/1985 | Blenkush | |

(Continued)

FOREIGN PATENT DOCUMENTS

| DE | 1298378 B | 6/1969 |
|---|---|---|
| DE | 29723663 U1 | 1/1999 |

(Continued)

OTHER PUBLICATIONS

International Search Report and Written Opinion in PCT/US2013/045666 dated Sep. 23, 2013, 13 pages.

*Primary Examiner* — Kevin Lee
(74) *Attorney, Agent, or Firm* — Merchant & Gould P.C.

(57) ABSTRACT

A valved insert for insertion into a coupling body is disclosed. In one embodiment, the valved insert includes a housing and an internal valve slidably disposed within an internal passage of the housing. The housing can be configured to have a sidewall defining an internal flow passage, a first open end and a retaining clip recess. The sidewall has a first thickness at the first open end and a second thickness adjacent to the clip recess. In one embodiment, the retaining clip recess has a height that is greater than one half the first thickness and less than or equal to one half the second thickness. The internal valve and the housing can also be provided with corresponding stop surfaces to limit the inward motion of the internal valve into the housing. In one embodiment, the stop surfaces are angled to form ramped surfaces.

14 Claims, 7 Drawing Sheets

(56) References Cited

U.S. PATENT DOCUMENTS

| | | | |
|---|---|---|---|
| 5,002,254 A | 3/1991 | Belisaire et al. | |
| 5,052,725 A * | 10/1991 | Meyer et al. | 285/317 |
| 5,104,158 A | 4/1992 | Meyer et al. | |
| 5,494,074 A * | 2/1996 | Ramacier et al. | 137/614.04 |
| 5,765,612 A | 6/1998 | Morin | |
| 5,845,943 A | 12/1998 | Ramacier et al. | |
| 5,911,403 A * | 6/1999 | deCler et al. | 137/614.03 |
| 6,024,124 A | 2/2000 | Braun et al. | |
| 6,161,578 A | 12/2000 | Braun et al. | |
| 6,758,457 B2 | 7/2004 | Nicolino et al. | |
| 6,837,262 B2 | 1/2005 | Cortez et al. | |
| 6,895,952 B1 | 5/2005 | Bachelder | |
| 7,117,892 B2 * | 10/2006 | Krywitsky | 137/614.04 |
| 7,547,047 B2 * | 6/2009 | deCler et al. | 285/317 |
| 8,256,743 B2 | 9/2012 | Tiberghien et al. | |
| 2003/0132631 A1 | 7/2003 | Nagata et al. | |
| 2005/0012330 A1 | 1/2005 | Schmidt | |
| 2010/0276922 A1 | 11/2010 | Rehder et al. | |
| 2013/0092271 A1 | 4/2013 | Downs et al. | |

FOREIGN PATENT DOCUMENTS

| | | |
|---|---|---|
| DE | 20011308 U1 | 12/2000 |
| EP | 0200561 A2 | 11/1986 |
| EP | 0375581 A1 | 6/1990 |
| WO | 2008008392 A2 | 1/2008 |

* cited by examiner

FIG. 7

QUICK DISCONNECT COUPLING

BACKGROUND

Quick disconnect couplings are often used in applications where it is necessary to connect and disconnect fluid lines with some regularity. In some applications, the quick disconnect coupling is provided with a valve structure in an insert and a valve structure in a receiving coupling body that allows fluid to flow through the coupling when in a connected state, but prevents flow through either line when in a disconnected state. Often, these types of couplings have spring-biased valves which make it necessary to lock the coupling together with a locking mechanism such that the valves and/or line pressure do not force the insert and coupling body apart undesirably. Such locking mechanisms can be manufactured from a metal, while the insert and coupling bodies are manufactured from a plastic. In such an arrangement, the insert is often subjected to eccentric side loading and point stress from the locking mechanism, which can limit performance of the coupling.

SUMMARY

A valved insert for insertion into a coupling body is disclosed. In one embodiment, the valved insert comprises a housing and an internal valve slidably disposed within an internal passage of the housing. The housing can be configured to have a sidewall defining an internal flow passage, a first open end and a retaining clip recess. The sidewall has a first thickness at the first open end and a second thickness adjacent to the clip recess. In one embodiment, the retaining clip recess has a height that is greater than one half the first thickness and less than or equal to one half the second thickness. Additionally, the internal valve and the housing can be provided with corresponding stop surfaces to limit the inward motion of the internal valve into the housing. In one embodiment, the stop surfaces are angled to form ramped surfaces.

A quick-disconnect coupling is also disclosed. In one embodiment, the quick-disconnect coupling includes a coupling body having a first housing defining a first internal diameter, a first internal valve disposed within the housing defining a second internal diameter, and a retaining clip mounted to the housing. In one embodiment, the quick-disconnect coupling includes a valved insert including a second housing having a sidewall defining a first outside diameter, an internal flow passage, a first open end, and a retaining clip recess for engaging the retaining clip. In one embodiment, the first outside diameter is less than or equal to the first internal diameter of the first housing and has a first thickness at the first open end and a second thickness adjacent to the clip recess. In one embodiment, the retaining clip recess has a height that is greater than one half the first thickness and less than or equal to one half the second thickness. In one embodiment, a second internal valve is disposed within the second housing having a third internal diameter that is about the same size as the second internal diameter of the first internal valve.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
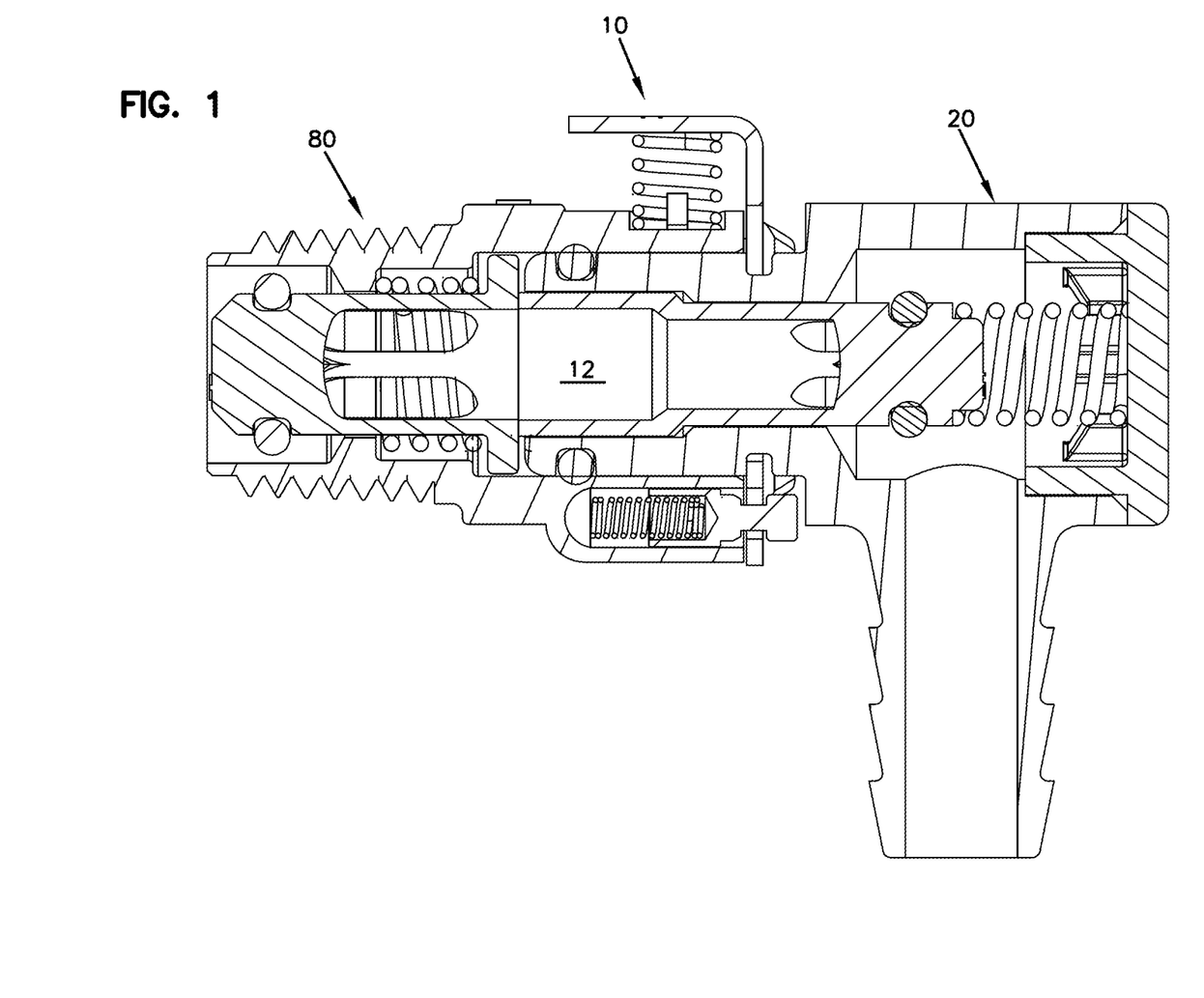
FIG. 1 is a cross-sectional view of a quick disconnect coupling in a connected state.
Figure 2:
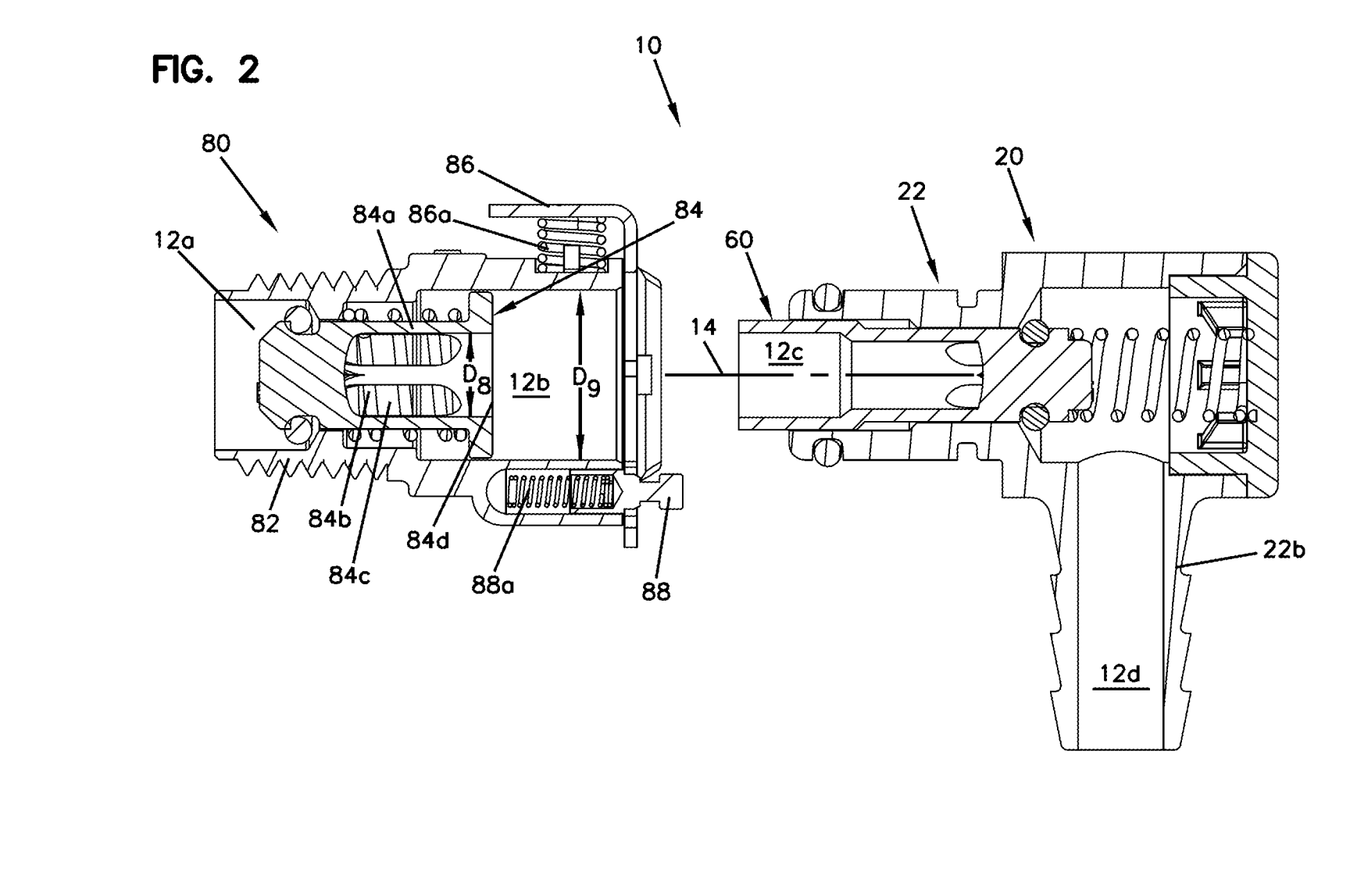
FIG. 2 is a cross-sectional view of the quick disconnect coupling of FIG. 1 in a disconnected state.

With reference to FIG. 1, a quick disconnect coupling 10 is shown. Quick disconnect coupling 10 is for providing a fluid tight connection between two fluid lines (not shown) via an internal passageway 12 when the quick disconnect coupling 10 is in a connected state, as shown in FIG. 1. Quick disconnect coupling 10 is also for preventing fluid in the lines from escaping when the quick disconnect coupling 10 is in a disconnected state, as shown in FIG. 2. In the particular embodiment shown, quick disconnect coupling 10 includes a valved insert 20 and a valved coupling body 80 that together form the open fluid passageway 12 when connected together and, when separated, block the fluid passageway 12.

Referring to FIG. 2, valved coupling body 80 includes a housing 82 defining a first portion 12a and a second portion 12b of the internal passageway. Within housing 82, a spring-biased valve 84 is provided that allows for selective fluid communication between the first and second internal passageway portions 12a, 12b. The valve 84 has a cartridge 84a biased to a closed position by a spring 84b, as shown in FIG. 2. Upon insertion of the insert 20, the valve 84 is forced into an open position, as shown in FIG. 1, whereby ports 84c and open end 84d in the cartridge 84a provide fluid communication between the first internal passageway portion 12a and the second internal passageway portion 12b. The open end 84d has an internal diameter $D_8$ while the second internal passageway portion 12b within which cartridge 84a slides has an internal diameter $D_9$. Many other sizes may be utilized depending on application and flow rate requirements.

Valve coupling body 80 further includes a self-actuating, spring biased retaining clip 86 that positively engages a corresponding recess 22d in the valved insert 20. The retaining clip 86 is initially held in an open position by a spring biased release pin 88 and moves to a closed position automatically via force from the spring 86a when the release pin 88 is pressed inwards towards the housing 82 by pressure from the insert 20 as it is being inserted into the coupling body 80. Once the retaining clip 86 has moved to the closed position, the retaining clip 86 ensures that the quick disconnect coupling 10 is securely held into a connected state thereby preventing line pressure from separating the coupling 10. To release the insert 20 from the body 80, an opening force perpendicular to the longitudinal axis 14 of the coupling 10 that is greater than that of the spring 86a associated with the retaining clip 86 is required. Upon the use of such a force, spring 88a moves the release pin 88 back to its original position whereby the retaining clip 86 is held in an open position. Coupling bodies of this type are well known in the art and will therefore not be discussed in greater detail.

Still referring to FIG. 2, valved insert 20 includes an insert housing 22 defining a third portion 12c and a fourth portion 12d of the internal passage 12. Within insert housing 22, and spanning the first and second passage portions 12a, 12b, is a valve 60 that selectively provides for fluid communication between the third and fourth internal passage portions 12c, 12d. As shown, insert housing 22 includes a first section 22a configured for connecting the insert housing 22 to the coupling body 80 and a second section 22b configured for connecting the insert body to a fluid line (not shown). In one embodiment second section 22b has a plurality of barbs 22e for connecting the housing 22 to a line or hose. One skilled in the art will appreciate that instead of forming an elbow, a straight coupling could be provided instead.

Figure 3:
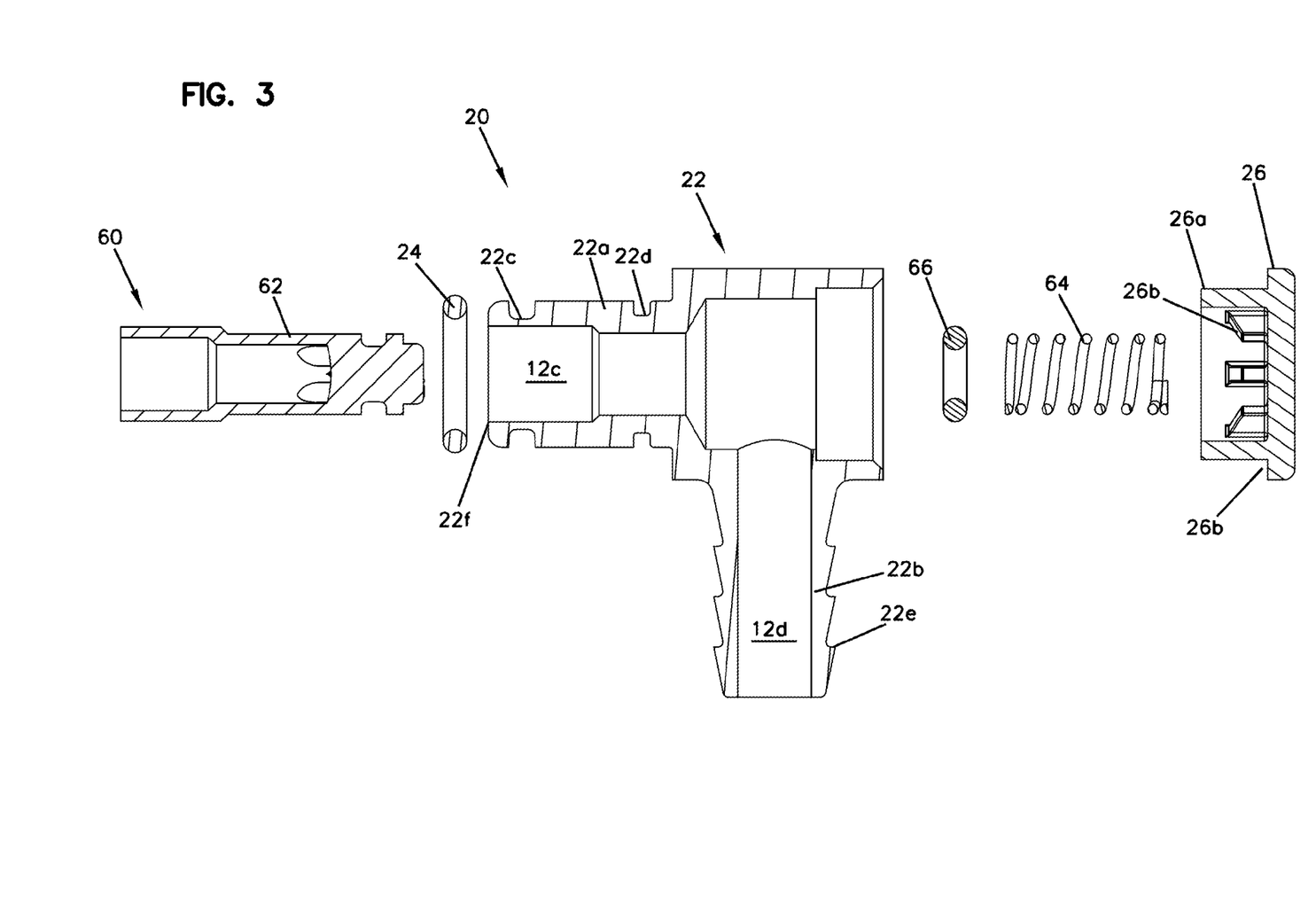
FIG. 3 is an exploded cross-sectional view of a valved insert suitable for use in the quick disconnect coupling shown in FIG. 1.

With reference to FIG. 3, valve 60 is shown in further detail. Valve 60 includes a cartridge 62, a biasing spring 64, and a seal member 66. Cartridge 62 is provided with an open first end 62a and a plurality of ports 62b that allow for fluid to flow from the interior to the exterior of the cartridge 62. Cartridge 62 is configured to be slidable within housing 22 and is biased by the biasing spring 64 into a closed position. In the closed position, the plurality of ports 62b are only in fluid communication with the third portion 12c of the internal passage and are blocked off from the fourth internal passage portion 12d. Seal member 66, shown as being a nitrile or fluoroelastomer O-ring, ensures that fluid cannot flow between the exterior of the cartridge 62 and the insert housing 22. Other types of seal member and materials are also possible. This valve construction prevents fluid from flowing out of the insert 20 when it is not connected to the coupling body 80. When the insert 20 is connected to the coupling body 80, the first open end 62a is forced into the insert housing 22 by contact with the valve 84 in the coupling body 80 whereby the cartridge 62 is moved into an open position. In the open position, the cartridge ports 62b slide into the fourth portion of the fluid passageway 12d and allow for fluid communication with the third internal passageway portion 12c. As such, the open position allows for fluid communication through the entirety of internal passageway 12.

Figure 4:
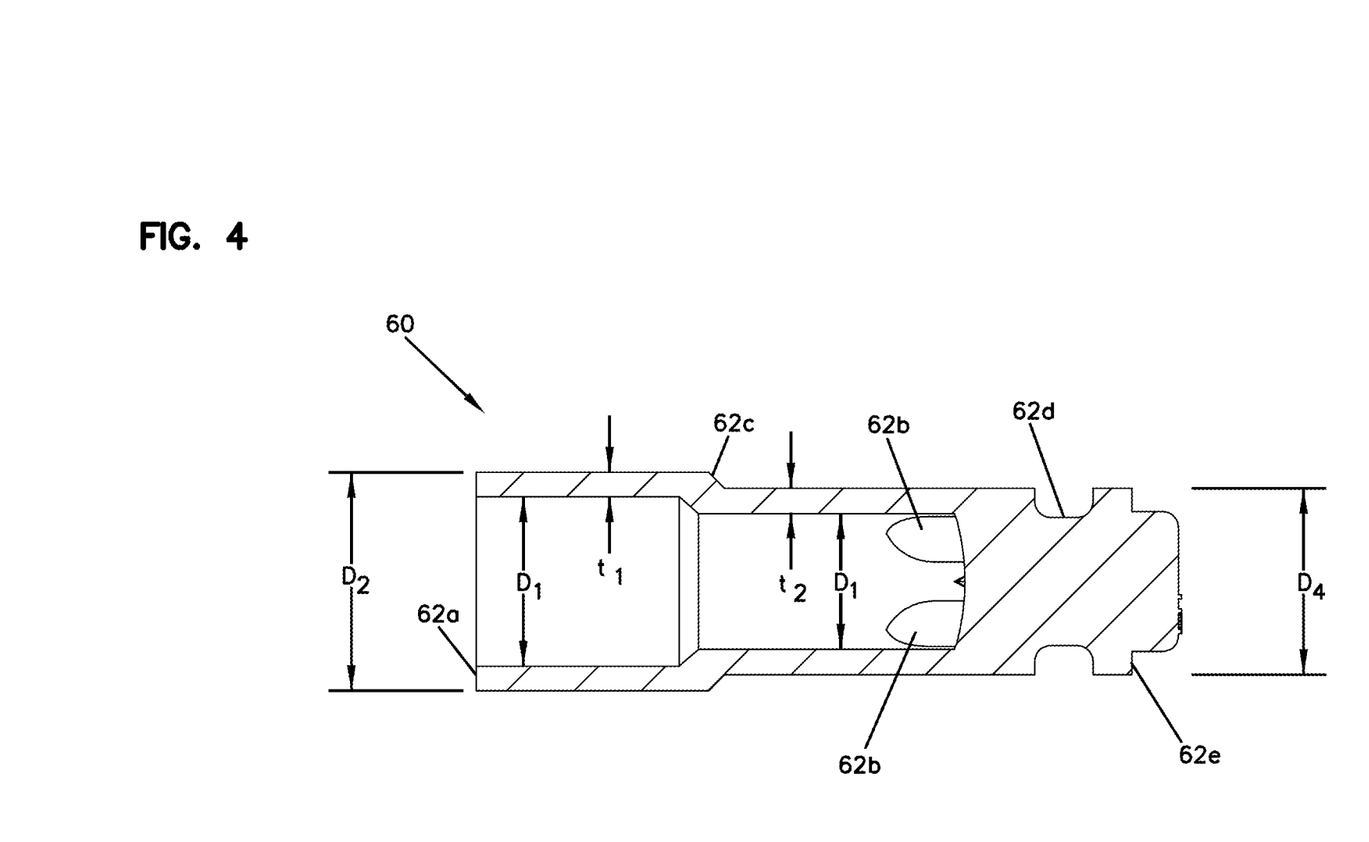
FIG. 4 is a cross-sectional view of a valve cartridge suitable for use in the quick disconnect coupling shown in FIG. 1.

Now turning to FIG. 4, valve cartridge 62 is shown enlarged for greater detail. At the first open end 62a, valve cartridge has an internal diameter $D_1$ and an outside diameter $D_2$ resulting in a wall thickness $t_1$. Many sizes may be utilized depending on application and flow rate requirements. At the location of the ports 62b, the internal and outside diameters of the valve cartridge 62 taper down to $D_3$ and $D_4$, respectively, to maintain a wall thickness $t_2$. Many sizes may be utilized depending on application and flow rate requirements. In general, internal diameter $D_1$ is sized to match the internal diameter $D_8$ of the valve 84 of the coupling body 80. As many coupling bodies are in existence, the internal diameter $D_1$ for an insert 20 will be constrained by the coupling body 80 dimensions for which the insert 20 is designed to couple.

At the point where the valve cartridge 62 wall tapers, a stop surface 62c is formed. The stop surface 62c has a height equal to the difference between outside diameter $D_2$ and $D_3$. Stop surface 62c engages a corresponding stop surface 22g on the insert housing 22 and acts to prevent the cartridge 62 from being forced into the housing 22 to a greater extent than desired. In operation, this feature prevents high pressure and/or flow from pushing the valve cartridge 62 and valve spring 64 to a further collapsed position that reduces flow, causes pulsing of the valve, and fluctuation in the flow when high pressure and/or flow is in the direction of the body 80 to the insert 20. In the embodiment shown, stop surfaces 62c and 22g are angled and form a ramped surface of about 45 degrees to the longitudinal axis 14 of the cartridge 62. However, other angles may be utilized, including a stop surface that is perpendicular to the longitudinal axis.

Beyond ports 62b, the valve cartridge 62 includes a recessed portion 62d for retaining the seal member 66 and a shoulder portion 62e for engaging the end of the biasing spring 64. In the embodiment shown, valve cartridge 62 is of unitary acetal thermoplastic construction. However, multiple parts could be assembled to form the above described cartridge. Cartridge 62 can also be made from a wide array of plastic and metal materials.

Referring back to FIG. 3, insert housing 22 further comprises a seal member 24 and an end cap 26. In the embodiment shown, seal member 24 is retained by a recess 22c in the insert housing 22 and can be a nitrile or fluoroelastomer O-ring. Other materials and types of seal members may also be utilized. Seal member 24 ensures that fluid cannot flow between the exterior of the insert housing 22 and the coupling body 80 near valve 84. Insert housing 22 also includes an end cap 26 for securing the biasing spring 64 and for allowing access to the interior of the insert housing 22 when assembling the valve. As shown, end cap 26 has a side wall 26a and an end wall 26b for engaging corresponding surfaces on the housing 22. End cap is shown as further including a plurality of support structures 26b which hold the biasing spring 64 in proper position and alignment. The end cap 26 may be also integral to the housing 22 instead of a separate component.

Figure 5:
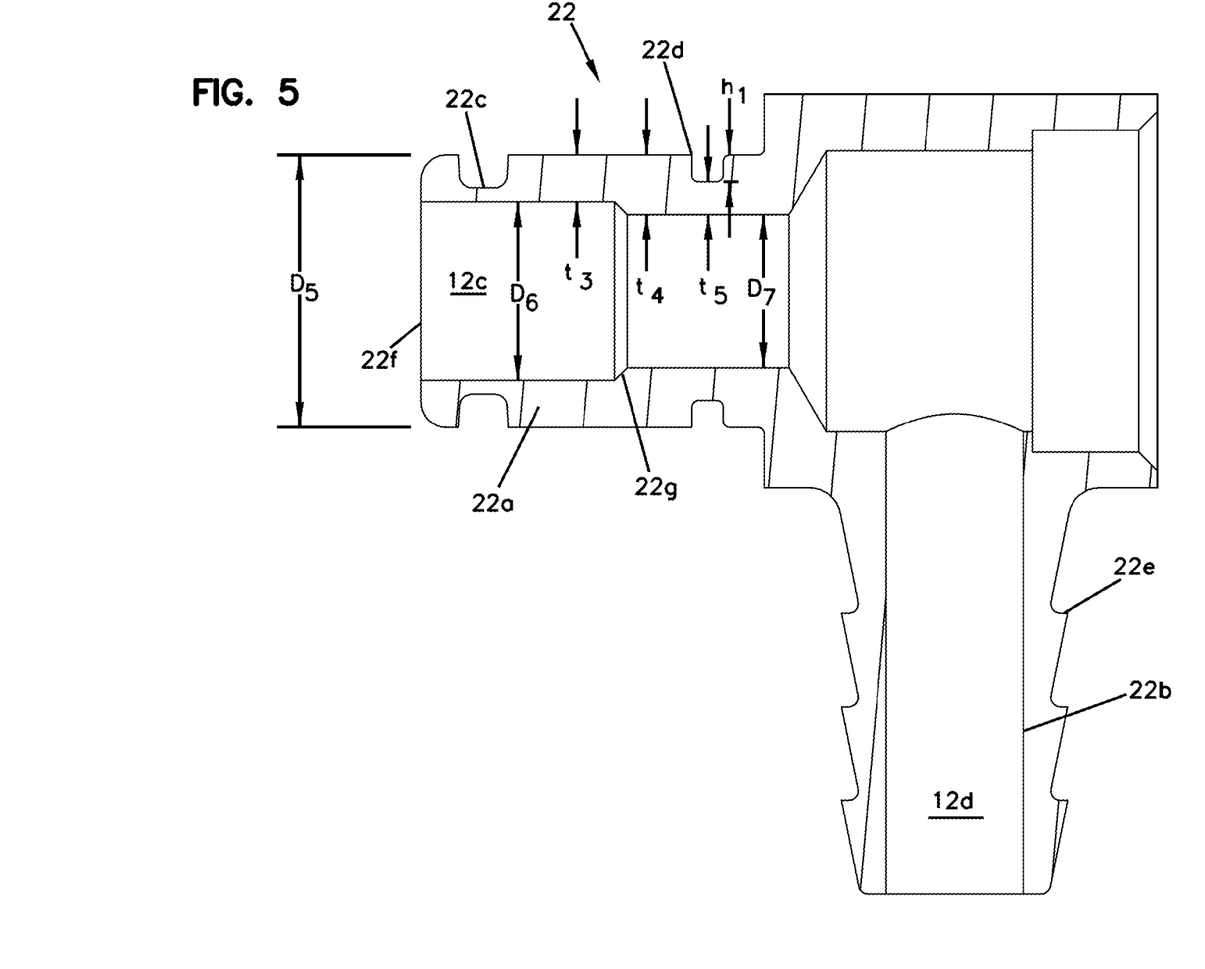
FIG. 5 is a cross-sectional view of an insert housing suitable for use in the quick disconnect coupling shown in FIG. 1.

Now referring to FIG. 5, insert housing 22 is shown enlarged and in further detail. As stated above, insert housing 22 includes a first section 22a and a second section 22b. First section 22a has an outside diameter $D_5$ and an internal diameter $D_6$ at a first open end 22f resulting in a wall thickness $t_3$. Further inward, the internal diameter decreases to a diameter $D_7$ resulting in an increased wall thickness $t_4$. At the transition point, a stop surface 22g is formed which corresponds to stop surface 62c on cartridge 62, the function of which has been previously described. At the portion where the internal diameter is $D_7$, clip recess 22d is provided. The wall thickness at this point is reduced to $t_5$ at recess 22d. In the embodiment shown, $t_5$ is about one half the thickness of $t_4$ such that the clip recess 22d has a height $h_1$ that does not result in a decreased wall thickness of more than half of the wall material adjacent to the recess 22d where the wall thickness is $t_4$. However, the height $h_1$ of clip recess 22d is shown as being more than half the thickness $t_3$ at the open end 22f of the first section 22a of the housing 22. Many sizes may be utilized depending on application and flow rate requirements. In one embodiment, $t_5$ is at least 0.04 inch while in another embodiment $t_5$ is at least 0.05 inch. In general, outside diameter $D_5$ is sized to match the internal diameter $D_9$ of the coupling body 80. As many coupling bodies are in existence, the outside diameter $D_5$ for an insert 20 will be constrained by the coupling body 80 dimensions for which the insert 20 is designed to couple with. As stated before, the size of the internal diameter $D_1$ of the cartridge 62 is also similarly constrained.

Due to the above identified constraints, it is often the case that little material is left to make up the wall thickness in the housing 22 at the point of the clip recess 22d, thereby creating a weakened point in the structure. However, because the internal diameter of the first section 22a of the insert housing 22 tapers down to $D_7$ while the outside diameter $D_5$ is maintained, the thickness $t_5$ can be maintained at a greater value as compared to prior art constructions where the internal diameter remains constant throughout the first section. For example, were the internal diameter $D_6$ to be maintained beneath clip recess 22d, the thickness $t_5$ would be reduced by an amount equal to the difference between diameters $D_6$ and $D_7$. When coupled to the coupling body 80, retaining clip 86 can exert a considerable amount of point loading on the housing 22 at the location of the clip recess 22d. This condition is exacerbated by the circumstance that the retaining clip 86 is generally a metal component while the housing 22 is a plastic component. Any eccentric side loading of the quick disconnect coupling 10 will result in the end of the retaining clip 86 pressing directly on the clip recess 22d. Therefore, by reducing the internal diameter of the first section to diameter $D_7$, the thickness $t_5$ at the clip recess 22d can be increased significantly and better able to withstand eccentric loading from the retaining clip 86 without premature or unexpected failure.

Figure 6:
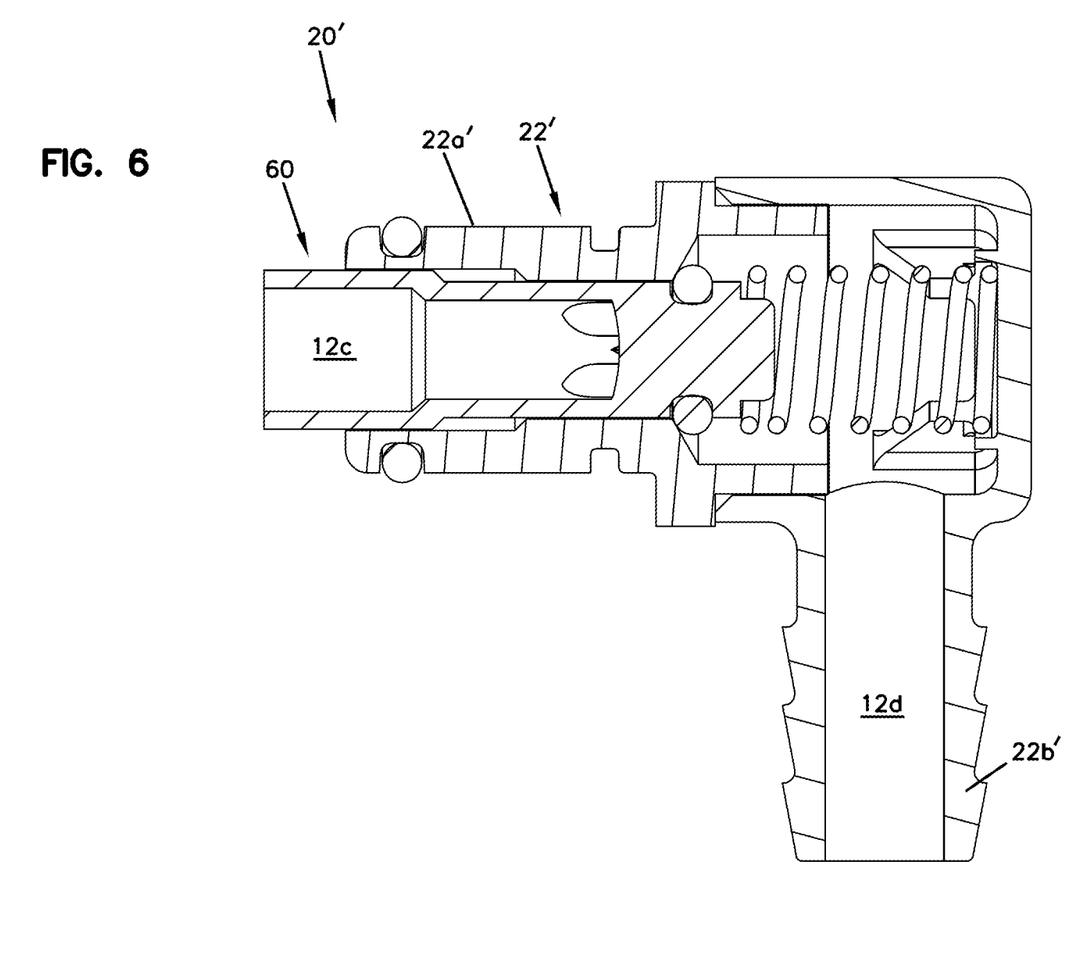
FIG. 6 is a cross-sectional view of an alternative embodiment of a valved insert.
Figure 7:
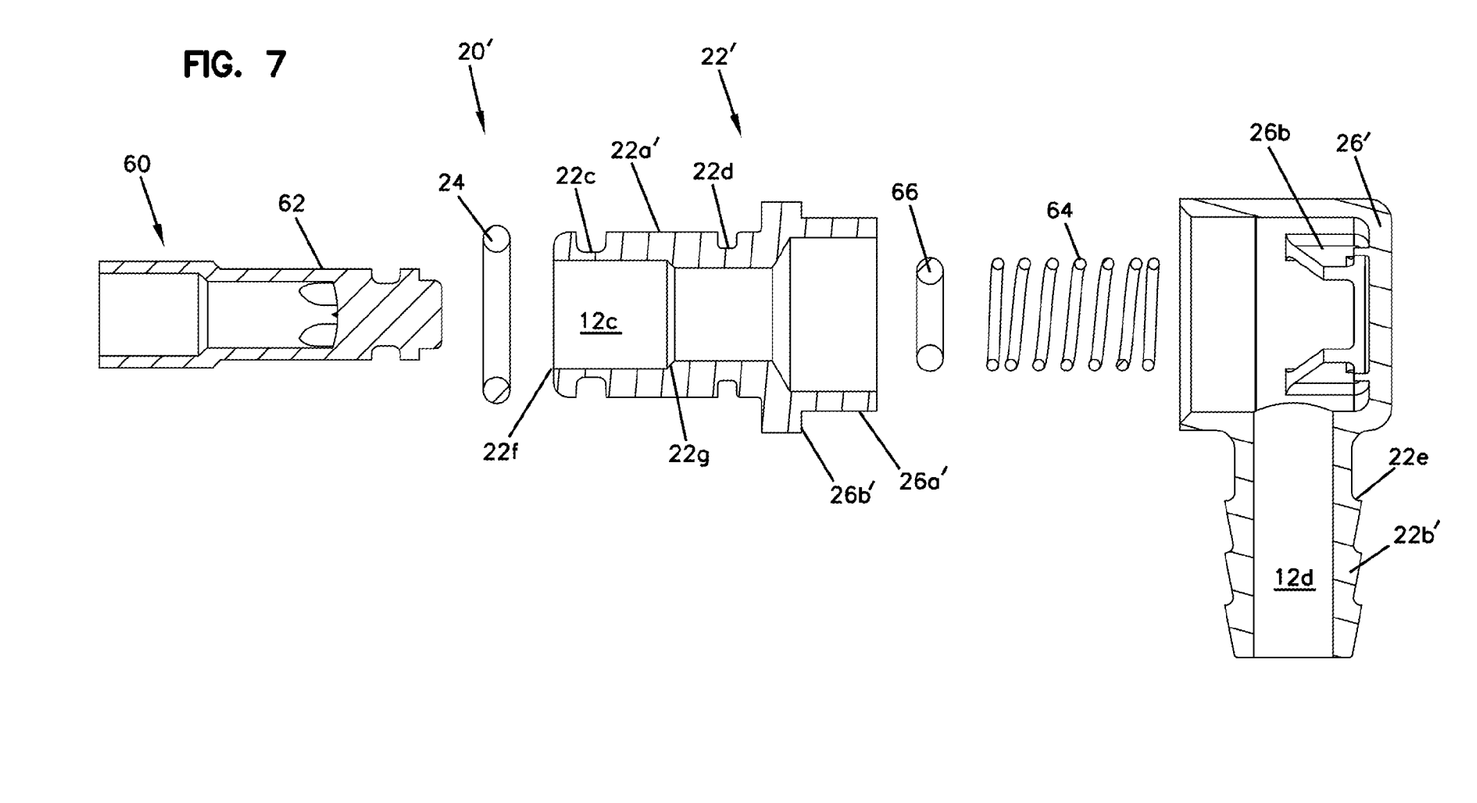
FIG. 7 is a cross-sectional exploded view of the valved insert shown in FIG. 6.

Referring to FIGS. 6 and 7, and alternative embodiment of the valved insert 20' is shown. As the primary features of valved insert 20' are similar to the features already described for valved insert 20, only the differences between the embodiments will be described here. The description of valved insert 20 is hereby incorporated by reference into the description of valved insert 20'. Where like features are shown, the same reference numbers will be used. It is noted that the previously described diameters and thicknesses for valved insert 20 are the same for valved insert 20'. In this embodiment, valve insert 20' includes a housing 22' with a first section 22a' that is joined to a second section 22b' instead of providing a unitary housing and end cap. As such, a side wall 26a' and an end wall 26b' are provided on first section 22a' and engage corresponding features on the second section 22b'. One skilled in the art will appreciate that these features may be present on either of first section 22a' or second section 22b'. As shown, second section 22b' forms an elbow having a plurality of barbs 22e for connection to a line or hose. One skilled in the art will also appreciate that instead of forming an elbow, a straight coupling could be provided instead.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

I claim:

1. A valved insert for insertion into a coupling body, the valved insert comprising:
   a. a housing having a sidewall defining an internal flow passage, a first open end and a retaining clip recess, the sidewall having a first thickness at a first portion extending from the first open end and a second thickness in which the retaining clip recess is defined, the retaining clip recess having a height that is greater than one half the first thickness and less than or equal to one half the second thickness, and a first internal diameter of the internal flow passage at the first portion being greater than a second internal diameter of the flow passage at the retaining clip recess; and
   b. an internal valve slidably disposed within the internal flow passage of the housing.

2. The valved insert according to claim 1, wherein the internal valve further comprises a stop surface for limiting an inward movement of the internal valve into the housing and wherein the housing further comprises a stop surface for engaging the stop surface of the internal valve.

3. The valved insert according to claim 2, wherein the stop surface of the internal valve and housing is a ramped surface that is at an angle to a longitudinal axis of the internal valve.

4. The valved insert according to claim 3, wherein the stop surface of the internal valve and housing is at about a 45 degree angle relative to the longitudinal axis of the internal valve.

5. The valved insert according to claim 1, wherein the housing forms an elbow.

6. The valved insert according to claim 5, wherein the housing includes a first section configured for connecting to the coupling body, and a second section configured for connecting to a fluid line.

7. The valved insert according to claim 6, wherein the housing including the first and second sections is unitary.

8. A quick disconnect coupling comprising:
   a. a valved coupling body comprising:
      i. a first housing having a first internal diameter;
      ii. a first internal valve disposed within the housing, the internal valve having a second internal diameter; and
      iii. a retaining clip mounted to the housing; and
   b. a valved insert comprising:
      i. a second housing having a sidewall defining a first outside diameter, an internal flow passage, a first open end, and a retaining clip recess for engaging the retaining clip:
         1. the first outside diameter being less than or equal to the first internal diameter of the first housing;
         2. the sidewall having a first thickness at the first open end of the second housing and a second thickness in which the retaining clip recess is defined; and
         3. the retaining clip recess having a height that is greater than one half the first thickness and less than or equal to one half the second thickness; and
      ii. a second internal valve disposed within the second housing, the second internal valve having a third internal diameter that is about equal to the second internal diameter of the first internal valve;
      iii. wherein the internal flow passage has a first internal diameter at the first thickness that is greater than a second internal diameter at the second thickness.

9. The quick disconnect coupling according to claim 8, wherein the second internal valve further comprises a stop surface for limiting an inward movement of the second internal valve into the second housing and wherein the second housing further comprises a stop surface for engaging the stop surface of the second internal valve.

10. The quick disconnect coupling according to claim 9, wherein the stop surface of the second internal valve and second housing is a ramped surface that is at an angle to a longitudinal axis of the second internal valve.

11. The quick disconnect coupling according to claim 10, wherein the stop surface of the second internal valve and second housing is at about a 45 degree angle relative to the longitudinal axis of the second internal valve.

12. The quick disconnect coupling according to claim 8, wherein the second housing forms an elbow.

13. The quick disconnect coupling according to claim 12, wherein the second housing includes a first section configured for connecting to the valved coupling body, and a second section configured for connecting to a fluid line.

14. The quick disconnect coupling according to claim 13, wherein the second housing including the first and second sections is unitary.

* * * * *